(12) United States Patent
Christophersen et al.

(10) Patent No.: US 9,971,587 B2
(45) Date of Patent: May 15, 2018

(54) SYSTEM AND METHOD FOR VALIDATING A CONTROLLER FOR AN AUTOMATED BANKING MACHINE USING A DISPLAYED INDICIA

(75) Inventors: Bryan James Christophersen, Hampshire (GB); Dominik Cipa, Niederwangen (CH); Gunnar Kunz, Niederwangen (CH); Ulrich Marti, Niederwangen (CH); Olivier Martin, Niederwangen (CH)

(73) Assignee: Glory Global Solutions (International) Limited, England (GB)

( * ) Notice: Subject to any disclaimer, the term of this patent is extended or adjusted under 35 U.S.C. 154(b) by 669 days.

(21) Appl. No.: 14/235,250

(22) PCT Filed: Jul. 24, 2012

(86) PCT No.: PCT/IB2012/001430
§ 371 (c)(1),
(2), (4) Date: Apr. 9, 2014

(87) PCT Pub. No.: WO2013/017926
PCT Pub. Date: Feb. 7, 2013

(65) Prior Publication Data
US 2014/0222672 A1    Aug. 7, 2014

Related U.S. Application Data

(60) Provisional application No. 61/513,023, filed on Jul. 29, 2011.

(51) Int. Cl.
*G06F 21/44* (2013.01)
*G07F 19/00* (2006.01)
(Continued)

(52) U.S. Cl.
CPC ........... *G06F 8/65* (2013.01); *G06Q 20/1085* (2013.01); *G06Q 20/40* (2013.01); *G07F 19/205* (2013.01); *G07F 19/206* (2013.01); *G06F 21/44* (2013.01)

(58) Field of Classification Search
None
See application file for complete search history.

(56) References Cited

U.S. PATENT DOCUMENTS 4,884,514 A    12/1989    Shockey et al.
5,563,393 A *  10/1996    Coutts ...................... G07F 9/02
                                                  209/534
(Continued)

FOREIGN PATENT DOCUMENTS

FR    2 919 654 A1      2/2009
FR    2919654 A1 *      2/2009    ......... G07C 9/00031
GB    2 395 978 A       6/2004

*Primary Examiner* — Steven S Kim
*Assistant Examiner* — Kristin D Sandoval
(74) *Attorney, Agent, or Firm* — Boyle Fredrickson, S.C.

(57) ABSTRACT

A computer implemented method for validating the identity of a controller for an automated banking machine based on displayed indicia. The method includes detecting access to a secure compartment of an automated banking machine, displaying a security indicia visible from the secure compartment, receiving the security indicia at an input device and a first controller accessible from outside of the secure compartment, and validating the identity of the controller based on the received security indicia.

8 Claims, 3 Drawing Sheets

(51) Int. Cl.
*G06F 9/445* (2018.01)
*G06Q 20/10* (2012.01)
*G06Q 20/40* (2012.01)

(56) References Cited

U.S. PATENT DOCUMENTS

| | | | |
|---|---|---|---|
| 7,717,327 B2 * | 5/2010 | Gomes | G06Q 20/1085 235/379 |
| 7,946,480 B2 * | 5/2011 | Miller | G06Q 20/1085 235/379 |
| 7,959,072 B1 | 6/2011 | Jenkins et al. | |
| 2007/0143225 A1 * | 6/2007 | Hamilton | G06Q 20/382 705/64 |

* cited by examiner

SYSTEM AND METHOD FOR VALIDATING A CONTROLLER FOR AN AUTOMATED BANKING MACHINE USING A DISPLAYED INDICIA

TECHNICAL FIELD

This invention relates to automated banking machine security. Specifically this invention relates to a system and method for display security indicia to validate the identity of a controller controlling the operation of the automated banking machine.

BACKGROUND

Automated banking machines are well known. Two known examples of an automated banking machine which are commonly found in banks are a teller cash recycler (TCR) and a teller cash dispenser (TCD). A TCR can be used to deposit or dispense notes to a bank customer under the supervision of a bank teller. A TCD can dispense notes only, under bank teller supervision, to a customer. A further type of automated banking machine used by customers is an automated teller machine ("ATM"). ATMs enable customers to carry out banking transactions without any assistance from a teller. Common banking transactions that may be carried out with ATMs include the dispensing of cash, the making of deposits, the transfer of funds between accounts, the payment of bills and account balance inquiries. Other types of automated banking machines may allow customers to charge against accounts or to transfer funds. Other types of automated banking machines may print or dispense items of value such as coupons or vouchers. For the purposes of this disclosure, an automated banking machine or automated transaction machine shall encompass any device which carries out transactions including transfers of value.

Typical automated banking machines include a plurality of devices including, for example, a computer, a touch screen, and banknote storage and dispensing mechanisms. An automated machine may further include a reinforced safe which is capable of enclosing both cash storage and dispensing mechanisms and also a computer which controls the operation of the machine. In other machines, the computer may be located outside the safe, although still within a locked enclosure or cover. Such enclosure or cover may be less secure than a safe and may be forced open. As a result, the computer may have an increased risk of being modified by unauthorized users. Such modifications may compromise the security of the machine and improperly cause the machine to dispense cash to the unauthorized user. Consequently, there exists a need for an automated banking machine that has increased protection against unauthorized access to the hardware devices of the machine.

In addition, the automated banking machine may be connected to a network which may include network protocols such as TCP/IP. As a result, machines which use TCP/IP may be attacked with the same types of hacking tools used to attack web sites and other types of computer systems on the Internet. Consequently, there also exists a need for an automated banking machine that has increased protection against unauthorized access to the machine through network communication.

Once an unauthorized user has gained access to the hardware of an automated banking machine, whether by network communication or physical access to the hardware, the unauthorized user may have the opportunity to capture transaction information such as device control strings, account numbers or personal identification numbers. As a result there further exists a need for an automated banking machine which has increased protection against the theft of transaction information.

SUMMARY OF THE INVENTION

According to an exemplary embodiment of the invention, an automated banking machine includes a computer, a display, a keypad, a store for banknotes and an openable secure cabinet, where the display and store for banknotes are located inside the secure cabinet and the keypad and computer are stored outside the secure cabinet, and wherein the display is adapted to display displayed indicia which is visible to an operator when the secure cabinet is opened, and wherein the automated banking machine further includes a comparator for comparing the displayed indicia with entered indicia, entered into the keypad by an operator.

According to another embodiment, the keypad may be arranged to be operational only when a security token is inserted into a socket which is located on an external surface of the automated banking machine as an additional security measure.

One exemplary embodiment of the invention includes computer implemented method for validating the identity of a controller for an automated banking machine based on displayed indicia. The method includes detecting access to a secure compartment of an automated banking machine, displaying a security indicia visible from the secure compartment, receiving the security indicia at an input device and a first controller accessible from outside of the secure compartment, and validating the identity of the controller based on the received security indicia.

The method may further include receiving a security key at a physical port of automated banking machine prior to displaying the security indicia. The method may further described where validating the identity of a controller based on the received security indicia includes receiving the security indicia at the second controller controlling the display of the security indicia.

According to one embodiment, the second controller is housed within the secure compartment. In another embodiment, the security indicia is encrypted based on a symmetrical secret key stored in memory of the first controller and memory of the second controller controlling the display of the security indicia.

Another exemplary embodiment of the invention includes a computer implemented system for validating the identity of a controller for an automated banking machine based on displayed indicia. The system includes a secure compartment, an access detection system detecting access to the secure compartment, a security indicia display visible within the secure compartment based on a signal from the access detection system, an input device accessible and associated first controller located outside the secure compartment for receiving the security indicia, and a second controller configured to validate the identity of the first controller based on the received security indicia.

Other features and advantages of the invention will become apparent to those skilled in the art from the following detailed description and accompanying drawings. It should be understood, however, that the detailed description and specific examples, while indicating the preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Exemplary embodiments of the invention are illustrated in the accompanying drawings in which like reference numerals represent like parts throughout light and in which.

DETAILED DESCRIPTION OF EXEMPLARY EMBODIMENTS

The automated banking machine described hereinbelow is a teller cash recycler (TCR). Its primary modes of operation involve receiving a stack of banknotes and storing them in appropriate storage modules, and dispensing banknotes from those storage modules to a user, typically a bank teller.

Figure 1:
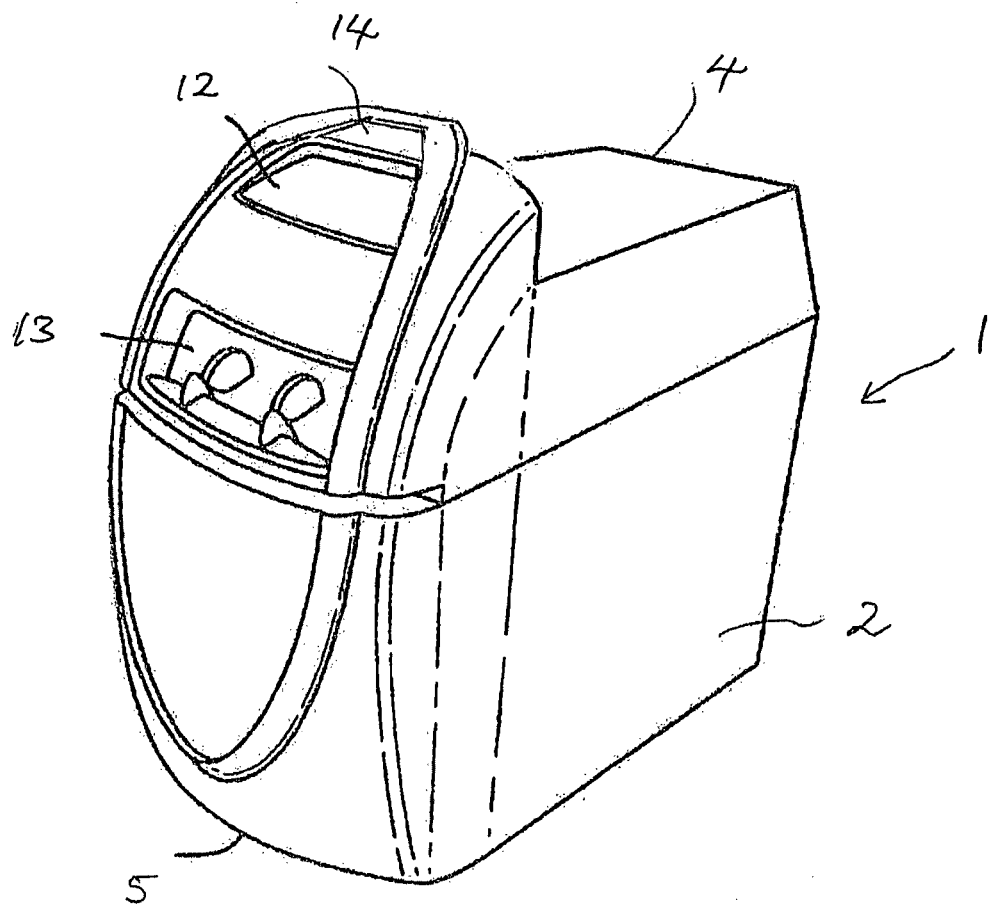
FIG. 1 is a perspective view of an automated banking machine.
Figure 2:
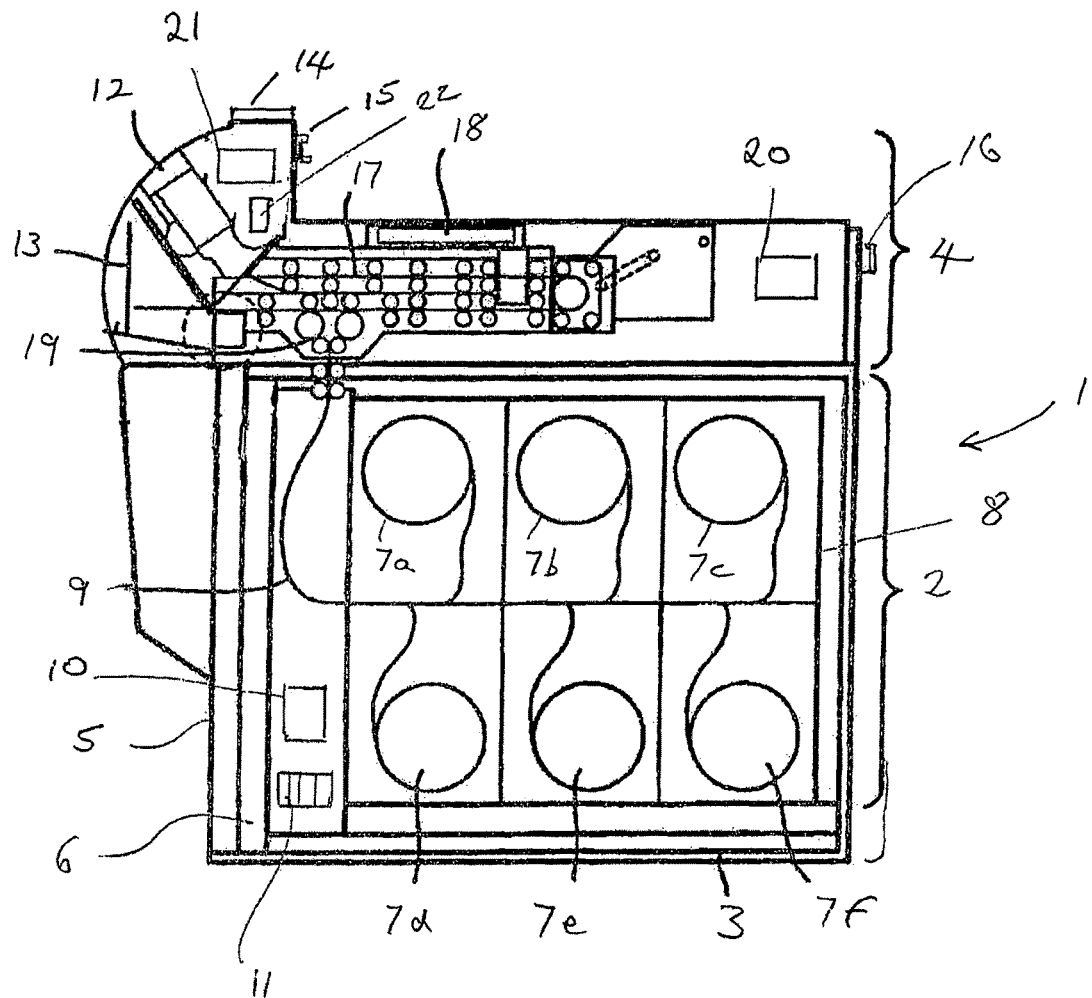
FIG. 2 is a schematic cross-sectional view of the automated banking machine of FIG. 1.

With reference to FIGS. 1 and 2, a TCR 1 comprises a (lower) cabinet 2 housing a safe 3 and an (upper) note handling module 4. The cabinet has a front panel 5 which can be opened to gain access to the safe 3 which, in turn is provided with a lockable door 6. The safe 3 houses a number of roll storage modules (RSMs) 7a-7f mounted on a frame 8, on which banknotes can be stored. Although the example shown incorporates six RSMs 7a-7f, other versions may include two, four, eight or more RSMs as desired Also inside the safe 3 is a lower note transport mechanism 9, several diverter switches (not shown) for diverting notes to one of the RSMs 7a-7f, a note transport and storage controller 10 and an internal display 11. The note handling module 4 includes an input module 12, a stacker 13, a touch screen 14 a USB socket 15 and a wired-network socket 16, all of which are accessible externally of the TCR 1. Inside the note handling module 4 are housed an upper transport mechanism 17, a detector module 18, a diverter switch 19, a note handling module controller 20, an interface controller 21 and a memory 22. The interface controller 21 is operably connected with the note transport and storage controller 10 via the note handling module controller 20 and by means of a CAN bus (not shown). The interface controller 21 is also operably connected with the touch screen 14 and memory 22. The internal display 11 is controlled by the lower transport controller 10.

Various modes of the TCR of FIGS. 1 and 2 will now be described. The detector modules 18, roll storage modules 7a-7f, transport mechanisms 17, 9 and diverter switch 19, are conventional and may operate in a fashion as described in Applicant's co-pending application WO 2008/047094. These components facilitate depositing banknotes which have been fed into the input module 12 by the user into the safe 3 and dispensing banknotes from the safe 3 into the stacker 13 for collection by the user.

Banknotes which have been placed into the input module 12 are fed one by one into the upper transport mechanism 17 for conveyance past the detector module 18 to the diverter switch 19. If the banknote is recognized by the detector module 18 as a bona fide note, the diverter switch 19 directs the banknote into the safe 3 and along the lower note transport mechanism 9 to a designated RSM 7a-7f. If a banknote is to be returned to the user, the diverter switch 9 directs the banknote to the stacker 13 from which it can be collected by the user. When a banknote is to be dispensed from a roll storage module 7a-7f, it is conveyed in the reverse direction out of the RSM along the lower note transport mechanism 9, and thence to the diverter switch 19 which directs the banknote to the stacker 13 where it can be collected by the user.

Instructions which cause the TCR to perform a transaction operation, such as depositing or dispensing one or more notes, are received by the interface controller. 21. In a first example, transaction operation instructions are generated at a teller workstation co-located with the TCR 1. These instructions are transmitted to the TCR 1 over a wired connection terminating at the wired-network socket 16 on the TCR 1. In an alternative arrangement, the instructions are transmitted wirelessly and the interface controller 21 is provided with a receiver for receiving such transmissions.

In either case, the instructions comprise at least one JavaScript Object Notation (JSON) document which is transported over a Secure Socket Layer (SSL) and using the Transmission Control Protocol/Internet Protocol (TCP/IP). Alternatively, the JSON document may be transported using the Hypertext Transfer Protocol Secure (HTTPS) communications protocol or using any other secure transport system and/or method. However, for convenience, the method with be described hereinafter with reference to SSL.

On receipt of a dispense instruction by the interface controller 21, the interface controller 21 processes the JSON document and generates further instructions for transmission to the note handling module controller 20 and note transport and storage controller 10 which in turn, activate the roll storage modules 7a-7f, diverter switch 19 and lower note transport mechanism 9 in order to dispense the amount of cash requested in the instruction. The interface controller 21 also generates a control signal for the touch screen 14 which displays a "Dispense in progress" message followed by "Dispense complete" in order to notify the teller that the transaction operation has been successful.

On receipt of a deposit instruction by the interface controller 21, the interface controller 21 processes the JSON document and generates further instructions for transmission to the note handling module controller 20, and note transport and storage controller 10 which in turn, activate the detector module 18, the roll storage modules 7a-7f, diverter switch 19 and transport mechanisms 9 and 17 in order to authenticate and store the notes which a teller has placed in the input module 12. The interface controller 21 also generates a control signal for the touch screen 14 which displays the value of the deposited notes to the teller.

In a second example, transaction operation instructions are generated at a remote monitoring station, such as a banking network's central computer. As in the first example, these instructions are transmitted to the TCR 1 over a wired or wireless communications channel and comprise at least one JavaScript Object Notation (JSON) document which is transported over a Secure Socket Layer (SSL) or using a https communication protocol and using the Transmission Control Protocol/Internet Protocol (TCP/IP).

On receipt of a dispense or deposit instruction from the remote central computer by the interface controller 21, the interface controller 21 processes the JSON document and generates further instructions for transmission as in the first example.

In a third example of an operating mode of the TCR 1 the interface controller 21 generates JSON documents and transmits them over a communications link (wired or wireless) over SSL (or SOAP or https) using TCP/IP to a monitoring station. These messages include status information and the monitoring station can be a banking network's central computer or a servicing agency. Status information can typically and usefully include fault reporting, the number of the notes in each RSM and the, number of transactions performed during a particular time period.

A method of downloading and installing configuration data into the teller cash recycling machine 1 of FIG. 1 will now be described. Such configuration data can be accessed by the TCR 1 from a remote source (not shown) and received by the interface controller 21 over a wired connection, through the wired network socket 16, or wirelessly. Conveniently, the configuration data can be downloaded as a package which is in a compressed (zipped) form.

Configuration data typically comprises at least some of the following; machine parameters, configuration scripts, firmware, operating system (OS) updates, pattern-sets, detection process configurations. The interface controller 21 is adapted to support the following three processes: download a configuration data package from the remote source into its internal memory; install the package; and on failure of installation or on demand, rollback to the last known working configuration. A configuration data package contains two major parts; meta-data and configuration elements. The package meta-data contains the following set of information; a UUID which unambiguously identifies the configuration package, a cryptographic signature which is: used to enforce package authenticity and integrity, a version id which is used for traceability purposes, and a descriptive text: which may be displayed on the touch screen 14 to give a summary of the package content. The package's configuration elements contain the actual machine configuration data, where each configuration element targets a specific "installation target."

A configuration package will not contain more than one configuration element per installation target. The term "installation target" refers to physical machine sub-systems such as the roll storage modules 7a-7f, and also to logical sub-systems such as the note handling module controller 20, OS, detector module configuration (e.g. pattern-sets) or interface controller access control. Depending on the particular installation target (sub-system) a configuration element might contain a variety of configuration data types. The interface controller 21 is configured to handle these transparently. Configuration elements typically carry machine parameters, configuration scripts, firmware, OS updates, pattern sets, and detection process configurations. In order to allow the interface controller 21 to handle the configuration elements transparently, each element consists of meta-information and the configuration data itself. The configuration element meta-data includes: a UUID which: unambiguously identifies the configuration element, an installation target id which identifies the logical or physical target sub-system, a priority id which is used to define an order in which configuration elements are installed and rolled-back, a list of compatibility id's which are used to check if the element may be installed on the targeted subsystem or not, a version id: used for traceability only and a descriptive text: which may be displayed on the touch screen 14 to provide the characteristics of the configuration element (e.g. "Detector module configuration package"). In certain instances it may be desired to install or rollback individual configuration elements in a certain order (e.g. OS update first then firmware then parameters). The interface controller 21 is therefore configured to install or rollback individual configuration elements in the order of increasing priority. Optionally, a configuration element may reference additional configuration data that can be executed in order to undo a previous installation.

When the interface controller 21 has received a configuration data package it will validate it and, if successful, store it in its internal memory. If the package is not valid, it will be rejected. The validation process includes two steps. Firstly, the package's signature is validated. The configuration package's meta-data includes a cryptographic signature. This protects the package content against external, unauthorized manipulation and furthermore enables an integrity check on the package content (like a check-sum). Secondly, a hardware compatibility check is done. The configuration elements' meta-data contains a list of hardware compatibility IDs. The aim of this validation is to check if the configuration package content is compatible with the machine's hardware and software configuration. This check is repeated after a successful installation.

The next process is the installation of the particular configuration package (e.g. identified by its UUID). This installation comprises the following steps: compiling a map of the state of all user level configuration parameters (based on key-value pairs); iterating over all configuration elements (sorted by its priority field) and forwarding the configuration data to the corresponding sub-system; restoring all user-level configuration parameters to the state that has been cached in the compilation step; and creating a system restore point. Conveniently, the note handling module controller 20 can act as proxy for all device-level sub-systems. In cases where the UUID of a configuration element matches the UUID of a previously installed element or previously created restore point, the installation process may be skipped. The compiling and restoring steps facilitate recovery of potential user specific settings after the package installation. However there is a potential conflict between configuration package parameters and user defined settings. To resolve the issue of which should take precedence, the interface controller 21 maintains a configurable list of parameter keys that are to be restored after the successful installation of a configuration package. Hence, only those parameters whose keys are found in the list are restored.

The creation of a system restore point allows the interface controller 21 to prepare for configuration rollbacks. A system restore point is automatically created at the end of a successful installation by simply storing the whole set of successfully installed configuration elements in the memory 22 along with the last set of user defined settings (ie. a list of key-value pairs). Physically this works by exactly just keeping the last successfully installed configuration element per sub-system. If a full configuration package is to be installed, then the complete last restore point is replaced by the new set of configuration elements. If, however, an update configuration package which just contains a sub-set of all configuration elements is to be installed, then the process just updates the relevant configuration elements out of the last restore point.

Another option allows for user defined restore points. For example, a field engineer creates a manual restore point (e.g. saved under the corresponding time-stamp) and subsequently performs an update of the machine. If the installation is successful but after some time the customer requests to go back to the previous configuration, having the manual restore point allows rollback to this point.

Another further option involves exporting system restore points to an external storage media and re-applying them to other automated banking machines. A cryptographic signature may be applied to the exported restore point.

A process for applying a restore point in the event of a rollback will now be described. In case anything goes wrong during the installation of a configuration package, the interface controller 21 will revert all configuration elements that have already been installed (including the one that has caused the failure) to the last automatic restore point. Note that an initial restore point will be an original factory setting restore point. The rollback algorithm works as follows. The interface controller 21 iterates over the set of configuration elements (sorted by priority-id) of the last restore point and checks if the UUID of the element matches the one that is installed in the corresponding sub-system. Further, the interface controller 21 checks if the last installation state of the configuration element is set to "VALID." If one or the other check delivers 'false' the configuration element is reinstalled by the one that is hosted within the last restore point. After this procedure the interface controller 21 restores the last set of user-settings from the restore point. Note that the rollback scenario requires the restoration of all user-setting as in this scenario user-settings take precedence over package settings.

As an alternative to automatic rollbacks in cases of installation failures, rollback to a manual restore point, or rollback to an exported restore point can be implemented. The rollback procedure can advantageously provides a tool for automatically recovering the machine in cases of hardware repairs (e.g. replacement of PCBs or complete modules etc. in the field).

In a further embodiment, the teller cash recycling machine 1 of FIG. 1 is provided with means for guarding against tampering, such as the unauthorized replacement of the interface controller 21. The note transport and storage controller 10 is in a secure location inside the safe 3 but the interface controller 21 is more vulnerable as it is outside the safe 3. The note transport and storage controller 10 needs to be sure that the interface controller 21, with which it is communicating, is the bona fide one and not one which has been tampered with or replaced. It also needs to know whether an operator who has gained access to the machine's interior is authorized to do so.

Figure 3:
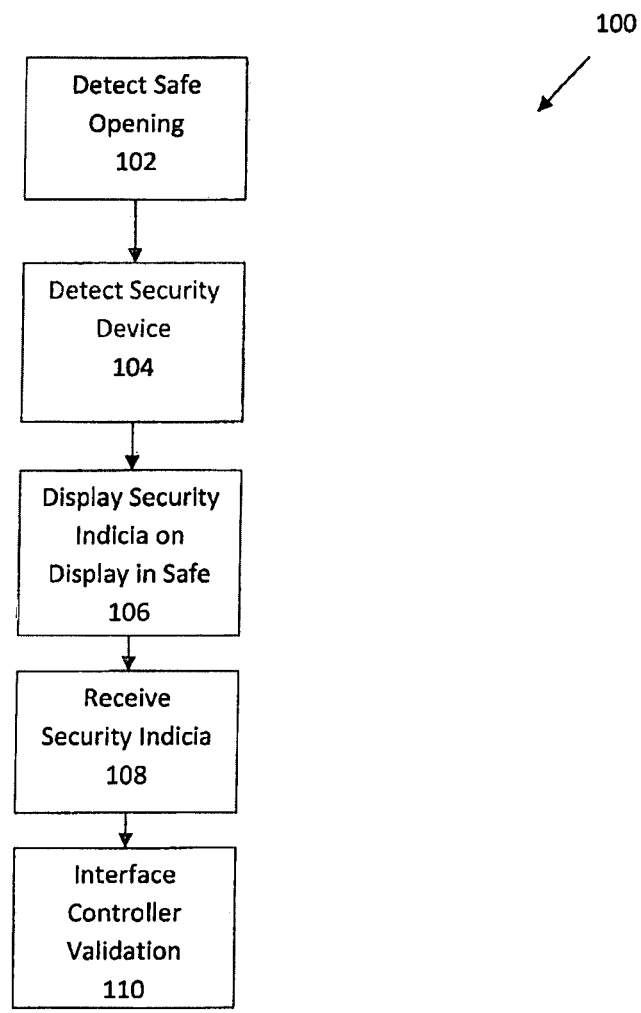
FIG. 3 is a flowchart illustrating a method for displaying security indicia in a locked security cabinet.

Referring now to FIG. 3, a flowchart illustrating a method for validating an interface controller of an automated banking machine is shown, according to an exemplary embodiment. In a step 102, interface controller 21 and/or note transport and storage controller 10 detect when an (authorized) operator unlocks and opens the safe door 6. Next, the operator plugs into the USB port 15, a security dongle (not shown) in a step 104. This step unlocks the touch screen 14 or enables a locally connected computer such as a laptop to connect to the controller 21. When the door 6 is opened, the interior display 11 is visible to the operator. On the interior display 11 is a sequence of numbers which is known to the note transport and storage controller 10 is displayed in a step 106. The operator subsequently enters into the touch screen 14 or connected laptop the sequence of numbers displayed in a step 108.

In a step 110, the note transport and storage controller verifies the identity of the interface controller based on the entered security indicia. The entered sequence is relayed to the note transport and storage controller 10 via the interface controller 21, and note handling module controller 20. The note transport and storage controller 10 compares the entered sequence with the known sequence. If the sequences match, then the interface controller 21 is deemed to be bona fide and the operator authorized. If the sequences do not match, then the note transport and storage controller 10 disables operation of the machine and no banknotes can be dispensed.

A refinement to the authorization procedure described above can be provided as follows. The sequence of numbers which are displayed on the internal display 11 and entered into the touchscreen 14 are used by the interface controller 21 and the transport and storage controller 10 to compute a symmetrical secret key. This key is used by the interface controller 21 to encrypt its own serial number and that of the note transport and storage controller 10. Data comprising these encrypted serial numbers are then transmitted from the interface controller 21 to the note transport and storage controller 10 for validation.

We claim:

1. A computer implemented method for validating an interface controller for an automated banking machine based on displayed indicia, the method implemented by performing a series of steps embodied in a non-transient computer readable medium, the steps comprising:
   determining, by at least one controller of the automated banking machine, that a lockable secure compartment door of a secure compartment has been opened;
   enabling an input device coupled to the interface controller;
   displaying a security indicia at an interior display of the secure compartment based on the determined opening of the lockable secure compartment door of the secure compartment;
   receiving, by the interface controller, the security indicia via the input device;
   generating, by the interface controller, a symmetric key using the received security indicia;
   encrypting, by the interface controller, a serial number of the interface controller and a serial number of the note transport and storage controller using the symmetric key;
   transmitting, by the interface controller, the encrypted serial numbers to the note transport and storage controller;
   validating, by the note transport and storage controller, the received encrypted serial numbers; and
   controlling, by the note transport and storage controller, operation of one or more components of the automated banking machine based on one or more received instructions from the interface controller and based on the validation.

2. The method of claim 1, further including receiving a security key at a physical port of automated banking machine prior to displaying the security indicia.

3. The method of claim 1, wherein the note transport and storage controller controls the display of the security indicia.

4. The method of claim 3, wherein the note transport and storage controller is housed within the secure compartment.

5. A computer implemented system for validating an interface controller for an automated banking machine based on displayed indicia, comprising:
   a secure compartment accessible through a lockable secure compartment door;
   a note transport and storage controller;
   an interface controller external to the secure compartment and configured to be coupled to an input device;
   an access detection system configured to determine, by at least one controller of the automated banking machine, that the lockable secure compartment door of the secure compartment has been opened; and a security indicia display within the secure compartment configured to display a security indicia based on the determined opening of the lockable secure compartment door of the secure compartment;

wherein the interface controller is configured to
receive a security indicia through the input device,
generate a symmetric key using the received security indicia, encrypt a serial number of the interface controller and a serial number of the note transport and storage controller using the symmetric key, and transmit the encrypted serial numbers to the note transport and storage controller; and further wherein the note transport and storage controller is configured to
validate the received encrypted serial numbers and control operation of one or more components of the automated banking machine based on one or more received instructions from the interface controller and based on the validation.

6. The system of claim 5, further including a physical port for receiving a security key prior to the display of the security indicia.

7. The system of claim 5, wherein the note transport and storage controller controls the display of the security indicia.

8. The system of claim 7, wherein the note transport and storage controller is housed within the secure compartment.

* * * * *